(12) United States Patent
Harrison et al.

(10) Patent No.: US 10,912,308 B2
(45) Date of Patent: Feb. 9, 2021

(54) CROSS CUT TENDERIZER

(71) Applicant: Ross Industries, Inc., Midland, VA (US)

(72) Inventors: William Lee Harrison, Culpeper, VA (US); David McAuley Alexander, Purcellville, VA (US)

(73) Assignee: ROSS Industries, Inc., Midland, VA (US)

( * ) Notice: Subject to any disclaimer, the term of this patent is extended or adjusted under 35 U.S.C. 154(b) by 0 days.

(21) Appl. No.: 16/330,967

(22) PCT Filed: Mar. 21, 2018

(86) PCT No.: PCT/US2018/023560
§ 371 (c)(1),
(2) Date: Mar. 6, 2019

(87) PCT Pub. No.: WO2018/145131
PCT Pub. Date: Aug. 9, 2018

(65) Prior Publication Data
US 2019/0343134 A1    Nov. 14, 2019

Related U.S. Application Data

(60) Provisional application No. 62/453,618, filed on Feb. 2, 2017.

(51) Int. Cl.
*A22C 9/00* (2006.01)
(52) U.S. Cl.
CPC .................................. *A22C 9/008* (2013.01)

(58) Field of Classification Search
CPC .................................. A22C 9/00; A22C 9/008
USPC .................................................... 452/141–144
See application file for complete search history.

(56) References Cited

U.S. PATENT DOCUMENTS

| | | | | |
|---|---|---|---|---|
| 2,243,492 A | * | 5/1941 | Wilson | A22C 9/004 452/142 |
| 2,420,549 A | * | 5/1947 | McKee | A22C 9/004 452/142 |
| 3,347,679 A | * | 10/1967 | Nordin | A23B 4/021 426/281 |
| 3,962,751 A | * | 6/1976 | Wagner | A22C 9/004 452/142 |
| 4,313,963 A | * | 2/1982 | Greenspan | A23L 13/72 426/264 |
| 4,360,952 A | * | 11/1982 | Sampson | A22C 9/004 452/142 |
| 4,660,253 A | * | 4/1987 | LoBiondo | A22C 9/004 452/142 |
| 5,340,354 A | * | 8/1994 | Anderson | A22C 9/004 452/142 |

(Continued)

*Primary Examiner* — Richard T Price, Jr.
(74) *Attorney, Agent, or Firm* — Patrick Stanzione; Stanzione & Associates, PLLC (57) ABSTRACT

A tenderizer system, apparatus and method to tenderize meat products and other foods through a cross-cut tenderizing process. This process can be performed by a tenderizer cartridge including at least two shafts in parallel, where a stack of blades are disposed on each shaft and in contact with each other along a respective shaft, each blade including teeth around outer circumferences such that each blade in contact is aligned to form continuous ridges that extend in parallel with the shafts.

23 Claims, 9 Drawing Sheets

(56) References Cited

U.S. PATENT DOCUMENTS

| | | | | |
|---|---|---|---|---|
| 5,342,236 A | * | 8/1994 | Repisky | B26D 1/24 |
| | | | | 452/142 |
| 5,738,578 A | * | 4/1998 | Marchese | A22C 9/008 |
| | | | | 452/142 |
| 5,850,786 A | * | 12/1998 | Bifulco | A22C 9/00 |
| | | | | 100/343 |
| 6,257,132 B1 | * | 7/2001 | Bifulco | A22C 9/004 |
| | | | | 100/161 |
| 2006/0003681 A1 | * | 1/2006 | Kindermann | A22C 9/004 |
| | | | | 452/142 |
| 2012/0276827 A1 | * | 11/2012 | Borkiewicz | A22C 9/008 |
| | | | | 452/142 |

\* cited by examiner

CROSS CUT TENDERIZER

REFERENCE TO RELATED APPLICATIONS

This application claims one or more inventions which were disclosed in International patent application: PCT/US18/23560, Mar. 21, 2018, entitled Cross Cut Tenderizer. The benefit under 35 USC § 120 of the United States provisional application is hereby claimed, and the aforementioned application is hereby incorporated herein by reference in its entirety.

BACKGROUND OF THE INVENTIVE CONCEPT

1. Field of the Invention

The present inventive concept relates to a meat tenderizer, and more particularly, to a meat tenderizer with a unique cross-cut configuration that performs bi-directional tenderizer cuts simultaneously.

2. Background

Traditional tenderizers are comprised of a set of two counter-rotating shafts incorporated into a cartridge, with a series of thin blades alternating with spacers. A unit of meat product (e.g., a steak) is inserted into the tenderizer cartridge and is pulled through by the action of the counter-rotating blades. During this process, the blades make slits and cuts into and through the product, thus tenderizing the product by lacerating the tissues within the meat. Any number of variations is available with this design. The thickness of the spacers determines the distance between the laceration lines, and the pitch of the teeth on the blades determines the number of lacerations along any given line. According to a conventional process, the meat product must be run through a tenderizer cartridge multiple times. During these multiple runs, the meat product is physically rotated 90 degrees to create a cross-hatch pattern on its surface. This cross-hatch pattern is what is usually seen on "cube steaks."

Figure 1:
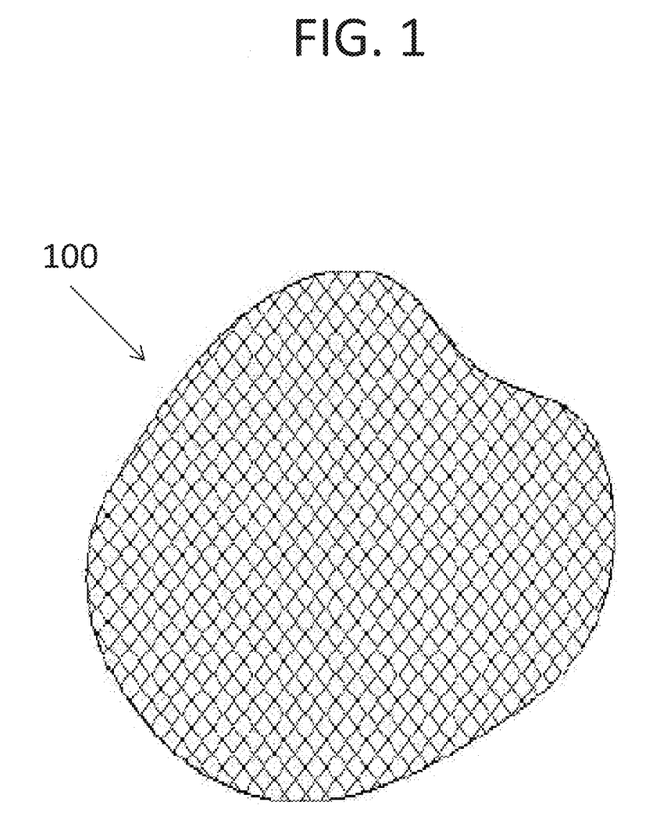
FIG. 1 illustrates a product that has been tenderized by a cross cut tenderizer.

FIG. 1 illustrates a meat product which has undergone tenderizing via a meat tenderizer, and has a cross-hatched pattern therein. In one prior art method of tenderizing meats, a person must be positioned at an exit end of a tenderizer cartridge or machine, to physically remove the product from the exit end of the tenderizer cartridge, lift the product off a belt that passes through the tenderizer cartridge, rotate the product by hand, and put the product back into the tenderizer cartridge at a 90-degree angle from the previous pass through the cartridge. This manual process is inefficient, subject to human error, and can be hazardous to the person placing one's hands near the cartridge since such cartridges have blades used for tenderizing.

The origin of the current idea of "cross cut" comes from the desire to automate this 90-degree rotation described above. Past efforts at automating the rotation of the product include using multiple tenderizer cartridges spaced apart with conveyor belts in between. The conveyor belts are designed to rotate the product 90 degrees between cartridges. Such a conventional system generally comprises two parallel conveyor belts, one belt moving faster than the other. As a product exits a cartridge and enters the center of this conveyor belt system, the product is rotated because one side is being moved faster than the other.

However, this automation technique has proven to be ineffective. For example, product must be exactly on the center of the two-conveyor-belt system and cannot be touching an obstacle (e.g., another piece of product). As such, even an "automated" system as known in the prior art requires a person positioned at an exit portion of a cartridge to manually position or turn the product exiting the cartridge.

3. Terminology

For the purposes of this application, the following terms are defined:

A "blade" is a single disc positioned on a shaft. Each blade includes a plurality of teeth configured to cut into meat product.

A "stack" comprises a plurality of blades arranged on a shaft.

A "cartridge" is a plurality of shafts disposed in matched co-rotating pairs, such that the rotation of the shafts draws meat product through the cartridge.

The functioning of each of these components is described in detail below.

4. Description of the Related Art

Figure 2A:
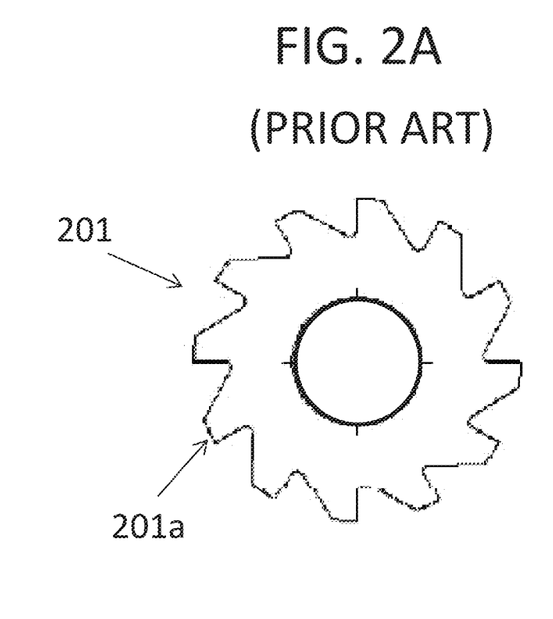
FIGS. 2A and 2B illustrate blades used in a conventional cross cut tenderizer.
Figure 2B:
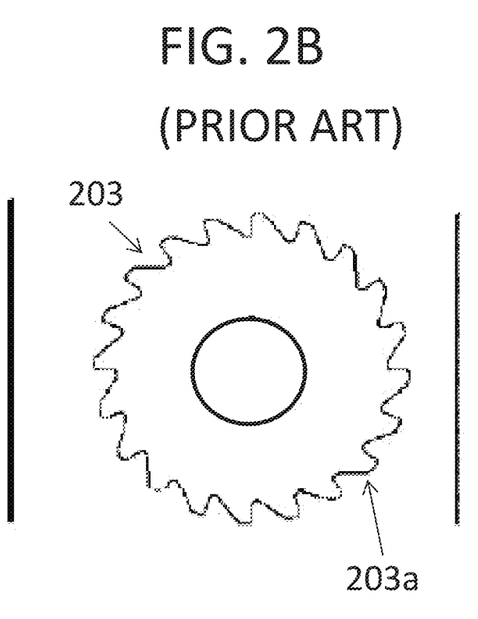

FIG. 2A illustrates a conventional tenderizer blade 201 used in a conventional tenderizer. The blade 201 includes teeth 201a surrounding the circumference of the blade 201. The teeth 201a have a saw-tooth shape with flat edges. The FIG. 2B illustrates another conventional tenderizer blade 203 used in a conventional tenderizer. The blade 203 includes teeth 203a surrounding the circumference of the blade 201. The teeth 203a are smaller than the teeth 201a and also have a saw-tooth shape with smaller edges. Blades 201 and 203 will be described in more detail with respect to FIG. 3A through FIG. 3C.

Figures 3A, 3B:
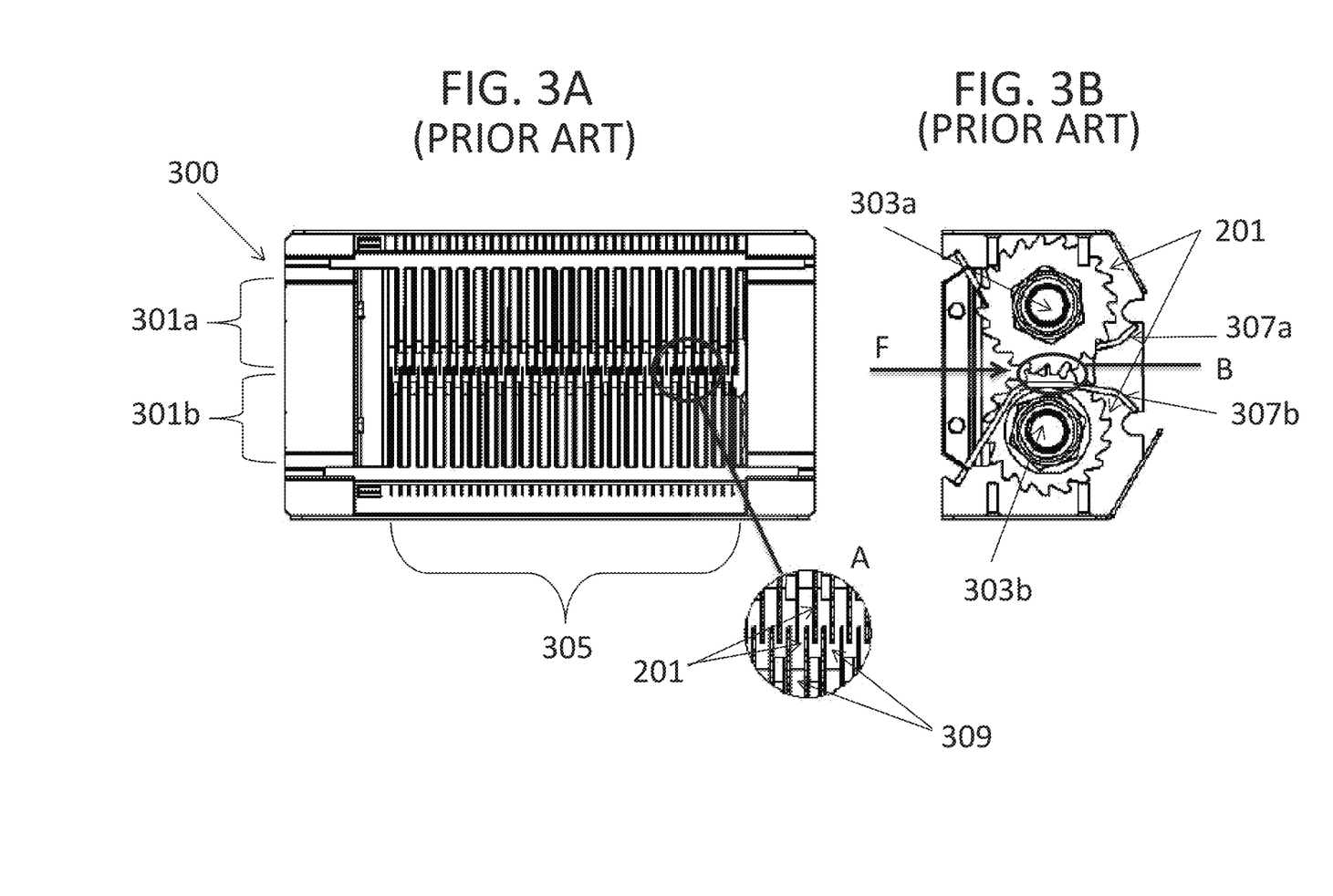
FIG. 3A illustrates a top view of a conventional cross cut tenderizer.
FIG. 3B illustrates an end view of a conventional cross cut tenderizer.

FIG. 3A illustrates a top view of a conventional tenderizer cartridge 300 including a stack 301a (or 301b) of blades 201 (or 203) aligned through a central axis thereof on a shaft 303a (or 303b) so that each stack 301a (or 301b) of blades 201 receive the respective shaft 303a (or 301b) through center holes therein (see FIGS. 2A and 2B). Each pair of the blades 201 in a stack 301a (or 301b) have spacers 309 therebetween and are otherwise adjacent to each other along the shaft 303a (303b) to form a wide enough tenderizing area 305 to receive meat products. As illustrated in FIG. 3A, an expanded section A of the blades 201 illustrates that the stack 301a of blades 201 on an upper shaft 303a are in parallel with another stack 301b of blades 201 on a lower shaft 303b, while the stack 301a of blades 201 on the upper shaft 303a are shifted from the stack of blades 201 on the lower shaft 303b. The blades 201 are thin and fit between each other with the aid of the spacers 309.

Figure 3C:
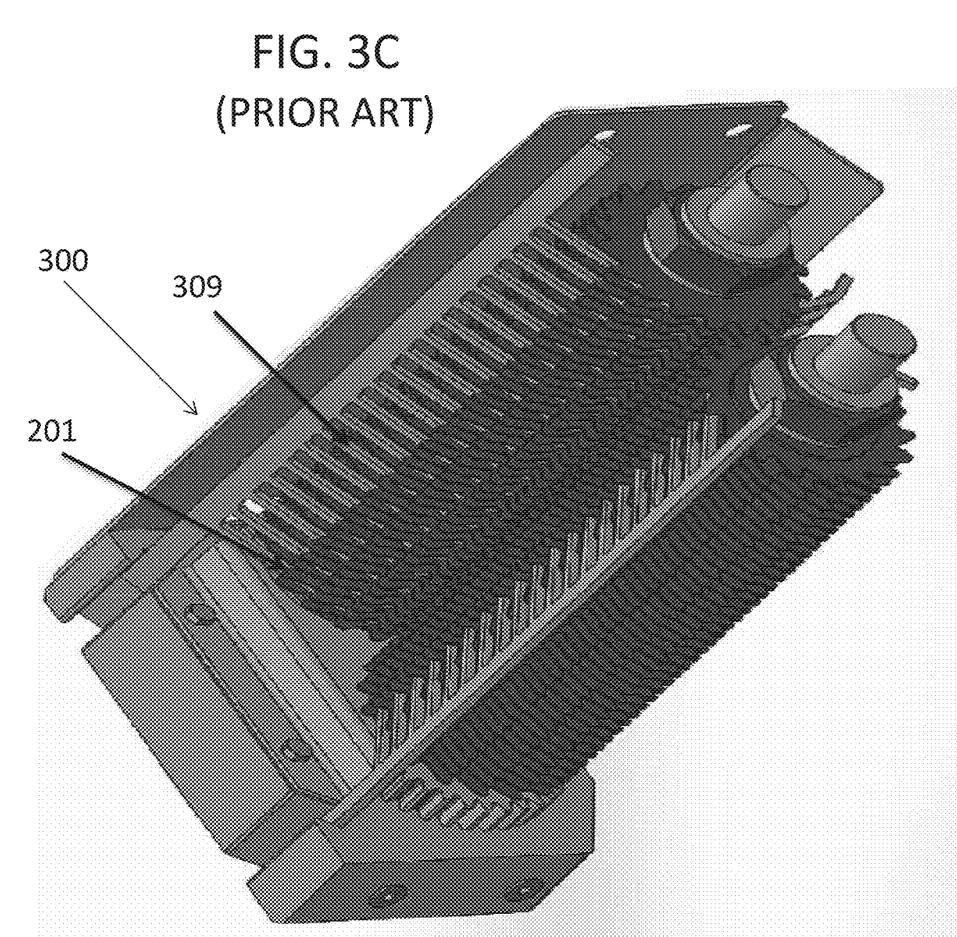
FIG. 3C illustrates an isometric view of a conventional cross cut tenderizer with a side removed.

FIG. 3B illustrates and end view of the tenderizer cartridge 300, and FIG. 3 illustrates an isometric view of the tenderizer cartridge 300 with a side removed. As illustrated at letter B in FIG. 3B, the stack 301a of blades 201 on the upper shaft 303a overlap with the stack 301b of blades 201 on the lower shaft 303b. FIG. 3B also illustrates a feed direction F in which the meat products are fed into the tenderizer cartridge 300 between the upper stack 301a and the lower stack 301b of blades 201.

However, with the tenderizer cartridge 300, as meat products are being fed between the upper and lower stacks 301a and 301b of blades 201, the teeth 201a of each of the blades 201 on the upper stack 301a and the lower stack 301b extend fairly deep into the meat product as a result of the teeth 201a on the upper stack 301a of blades overlapping the teeth 201a on the lower stack 301b of blades 201. As a result, as the meat products begins to exit from between the upper stack 301a and the lower stack 301b of blades 201, the meat tends to be stuck on the teeth 201a, and either starts to tear between the upper stack 301a and the lower stack 301b of blades 201, or bunches up at a separator 307a or 307b used to separate the meat product from the upper stack 301a and the lower stack 301b, respectively.

SUMMARY OF THE INVENTIVE CONCEPT

The forgoing and/or other features and utilities of the present inventive concept can be achieved by providing a cross-cut tenderizer, including: a cartridge body including: at least two shafts in parallel; and a stack of blades disposed on each shaft, at least a majority of the blades being in contact with each other along a respective shaft, each blade including teeth around outer circumferences thereof, the teeth of each blade in contact being in alignment to form continuous ridges that extend in parallel with the shafts.

In an example embodiment, the tenderizer may further include spacers disposed between a predetermined umber of blades in a stack to form separate groups of the blades along each shaft.

In another example embodiment, the blades on opposing shafts can be in alignment with each other.

In another example embodiment, the blades in alignment with each other on opposing shafts can also be in contact with each other.

In still another example embodiment, the blades in alignment with each other on opposing shafts can be separated from each other by a predetermined distance.

In still another example embodiment, tenderizer may further include a stripper extending from at least one portion of the cartridge body and in parallel with and adjacent to the length of a corresponding stack of blades, the stripper extending from a side of the cartridge body where tenderized products exit from the opposing stacks to separate the tenderized product from the stack.

In yet another example embodiment, the at least one stripper may include fingers extending therefrom at predetermined locations to extend between each group of stacks and above a respective spacer.

The forgoing and/or other features and utilities of the present inventive concept can also be achieved by providing a cross-cut tenderizer system, including: a cartridge body including a first cartridge portion and a second cartridge portion, wherein: the first cartridge portion includes first and second shafts in parallel, the first and second shafts each including a stack of adjacent blades with teeth thereon, each adjacent blade being separated by a spacer and the stack of blades on the first shaft being shifted from the stack of blades on the second shaft: and the second cartridge portion includes first and second shafts in parallel, the first and second shafts each including a stack of adjacent blades with teeth thereon, each stack of blades having teeth in alignment.

In an example embodiment, each stack of blades of the second cartridge portion including groups of blades being separated from each other by spacers, each group of blades being in contact with each other to form continuous ridges that extend in parallel with the shafts.

In another example embodiment, the blades on the first shaft of the first cartridge portion overlap with the blades on the second shaft of the first cartridge portion; and the blades on the first shaft of the second cartridge portion are aligned with the blades on the second shaft of the second portion and the teeth.

In another example embodiment, the teeth on each pair of aligned blades in the second cartridge are aligned with each other.

In still another example embodiment, the blades in alignment with each other on the first and second shafts may also be in contact with each other.

In yet another example embodiment, the blades in alignment with each other on the first and second shafts are separated from each other by a predetermined distance.

In yet another example embodiment, the tenderizer may further include a stripper extending from at least one portion of the second cartridge portion and in parallel with and adjacent to a corresponding one of the stacks of blades, the stripper extending from a side of the second cartridge portion where tenderized products exit from the first and second stacks to separate the tenderized product from the stack.

In yet another example embodiment, a stripper can extend from two portions of the second cartridge portion and in parallel with and adjacent to a corresponding stack of blades.

In still another example embodiment, fingers extending therefrom at predetermined locations to extend between each group of stacks and above a respective spacer.

In yet another example embodiment, the blades on the first shaft of the first cartridge portion may overlap with the blades on the second shaft of the first cartridge portion; and the blades on the first shaft of the second cartridge portion may be aligned with the blades on the second shaft of the second portion and the teeth.

In yet another example embodiment, the teeth on each pair of aligned blades in the second cartridge are aligned with each other.

In still another example embodiment, the blades in alignment with each other on the first and second shafts can also be in contact with each other.

In still another example embodiment, the blades in alignment with each other on the first and second shafts can be separated from each other by a predetermined distance.

The forgoing and/or other features and utilities of the present inventive concept can also be achieved by providing a meat product tenderizing method, including: feeding a meat product through one passage of a tenderizer system such that the tenderizing system; tenderizes the meat product along a length of the meat product as the product passes through a first set of blades; and tenderizes the meat product across the width of the meat product as the product passes through a second set of blades.

In an example embodiment, the tenderizing of the meat along the length thereof is substantially perpendicular to the tenderizing of the meat across the width thereof.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are 20 not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments of the present general inventive concept automate the cross-cut process efficiently and effectively. Example embodiments comprise a differently designed cartridge that will create a cut that is 90 degrees from the traditional cartridge in such a way that it substantially reproduces the lacerations that the traditional cartridge applies after a meat product has passed therethrough a second time at 90 degrees so that physically rotating the meat product is unnecessary.

As pointed out above, the present inventive concept pertains to the field of a tenderizer system, apparatus and method to tenderize meats and other foods. More particularly, the present inventive concept pertains to a tenderizer system, apparatus and method to tenderize meats and other foods, which performs a cross-cut tenderizing process.

A system according to example embodiments of the present general inventive concept comprises multiple cartridges. One cartridge can include a traditional blade design, and a second cartridge can include a cross-cut blade design. In this way the product can pass from one cartridge to another and receive a cross-cut pattern without needing to be physically rotated between cartridges.

Figure 4A:
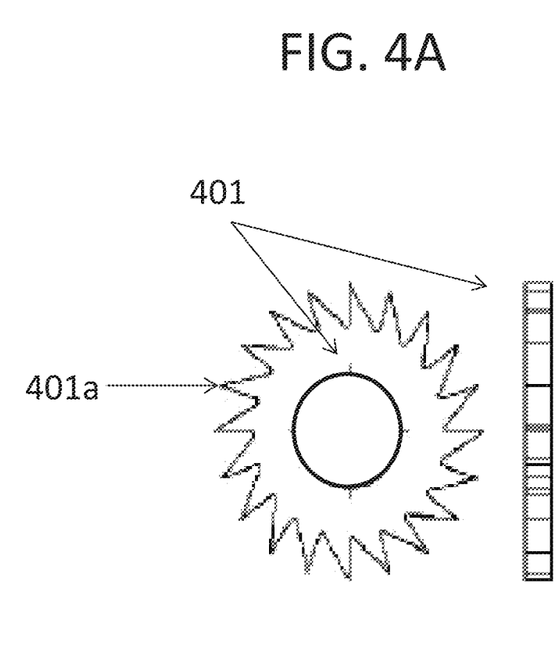
FIG. 4A illustrates side and front views of a blade used with a cross cut tenderizer according to an example embodiment of the present inventive concept.
Figure 4B:
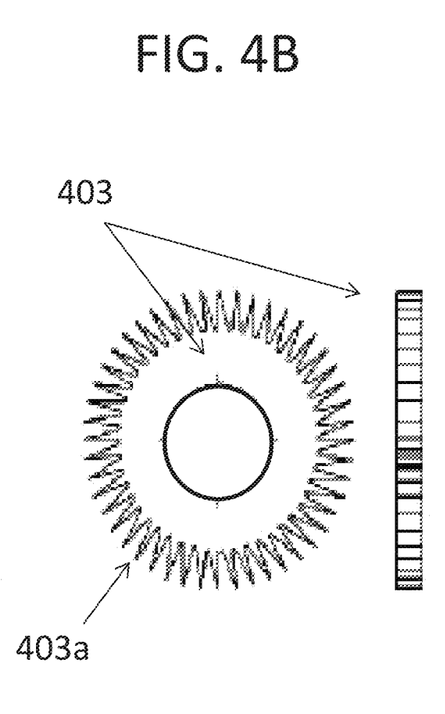
FIG. 4B illustrates side and front views of a blade used with a cross cut tenderizer according to another example embodiment of the present inventive concept.

FIGS. 4A through 4B illustrate side and edge views of two examples of cross cut blades 401 and 403, respectively, according to example embodiments of the present inventive concept. As illustrated therein, cross cut blades 401 and 403 according to example embodiments are significantly thicker than the traditional blades, such as blade 201 and blade 203 illustrated in FIGS. 2A and 2B, respectively. The blades 401 have significantly more pointed teeth 401a (403a) than those of the conventional teeth described with reference to FIGS. 2A and 2B. When referring to blades 401 hereinafter, the same reference can be applied equally to the blades 403 of the present inventive concept, in the alternative.

Figure 5A:
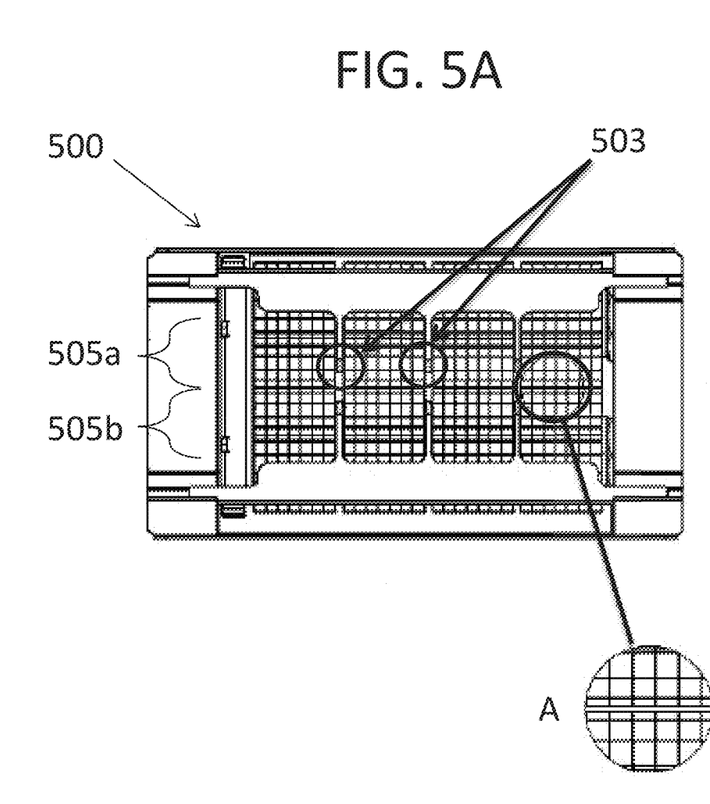
FIG. 5A illustrates a top view of a cross cut tenderizer cartridge according to an example embodiment of the present inventive concept.
Figure 5B:
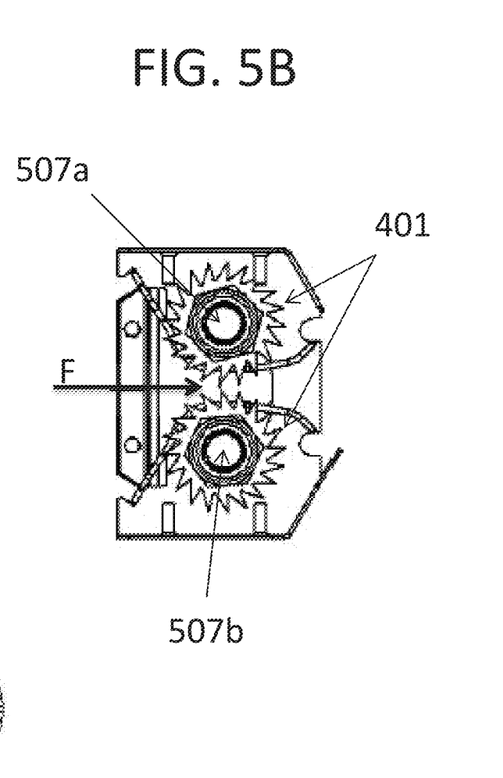
FIG. 5B illustrates an end view of a cross cut tenderizer according to the example embodiment of FIG. 5A.

FIGS. 5A through 5B respectively illustrate top and side views of a cross-cut cartridge according to an example embodiment herein. FIG. 5C illustrates an isometric view of the cartridge 500 with a side removed to expose the blades 401. Note that on the traditional cartridge (illustrated in FIGS. 3A and 3C) the blades 201 and spacers 309 on the opposing stacks 301a and 301b are alternated so that the blades on opposing stacks extend between each other. In the cross-cut cartridge illustrated in FIGS. 5A and 5C, however, multiple blades 401 are arranged adjacent to each other on shafts 507a and 507b to form a stack 505a, 505b, respectively, with only occasional spacers 503 between sets of blades 401. As a result, the teeth of the individual blades 401 in a stack 505a, 505b form continuous ridges that extend parallel to shafts 507a, 507b on which the blades 401 are mounted. In this way the cross-cut tenderizer cartridge 500 makes horizontal lacerations in the meat product, rather than vertical lacerations as in the traditional tenderizer cartridges.

As illustrated in FIGS. 5A through 5B, the blades 401 (or 403) on opposing shafts 507a and 507b in the cross-cut cartridge 500 are not required to overlap. The blades 401 on opposing shafts 507a and 507b in the cross-cut cartridge 500 may meet (i.e., extend to contact each other at a point between the shafts 507a and 507b) at the teeth 401a, or alternatively may have a separation therebetween. This construction, in which the blades 401 do not overlap, prevents the cross-cut blades 401 from interfering with one another or damaging the meat product, as described in more detail below.

The distance between the points of the teeth 401a on opposing blades 401 in the cartridge 500 can be varied to determine the depth that the blades 401 will protrude into the meat product. The blades 401 can be stacked on the shafts 507a, 507b such that the opposing teeth 401a align exactly (illustrated for example in FIG. 5B), or alternatively the opposing teeth 401a can be staggered such that the teeth on the opposing blades 401 do not align exactly. The number of blades 401 on each shaft 507a, 507b can also be varied.

There are as many possible variations with this design as with the traditional cartridge. For example, FIG. 4A illustrates coarse cross cut blade 401. FIGS. 5A through 5B illustrate top and side views of a cross cut cartridge 500 including coarse cross cut blades 401, according to an example embodiment of the present inventive concept. FIG. 4B illustrates a fine cross cut blade 403 in accordance with an alternative embodiment.

Figure 6A:
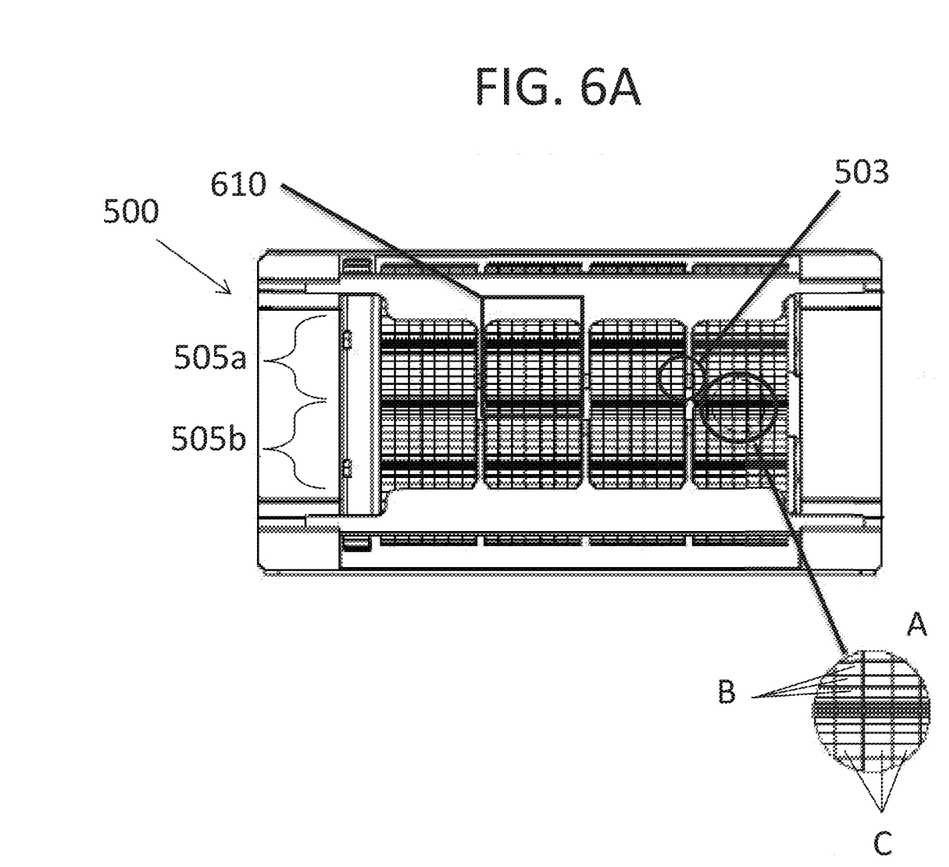
FIG. 6A illustrates a top view of a cross cut tenderizer cartridge according to another example embodiment of the present inventive concept.
Figure 6B:
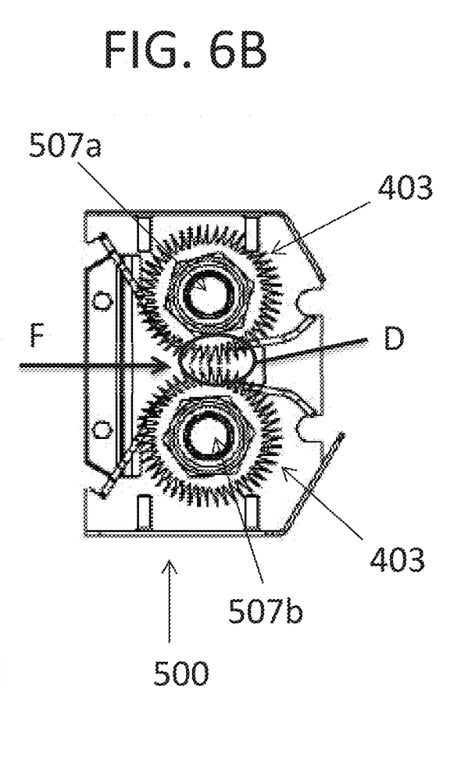
FIG. 6B illustrates an end view of a cross cut tenderizer according to the example embodiment of FIG. 6A
Figure 6C:
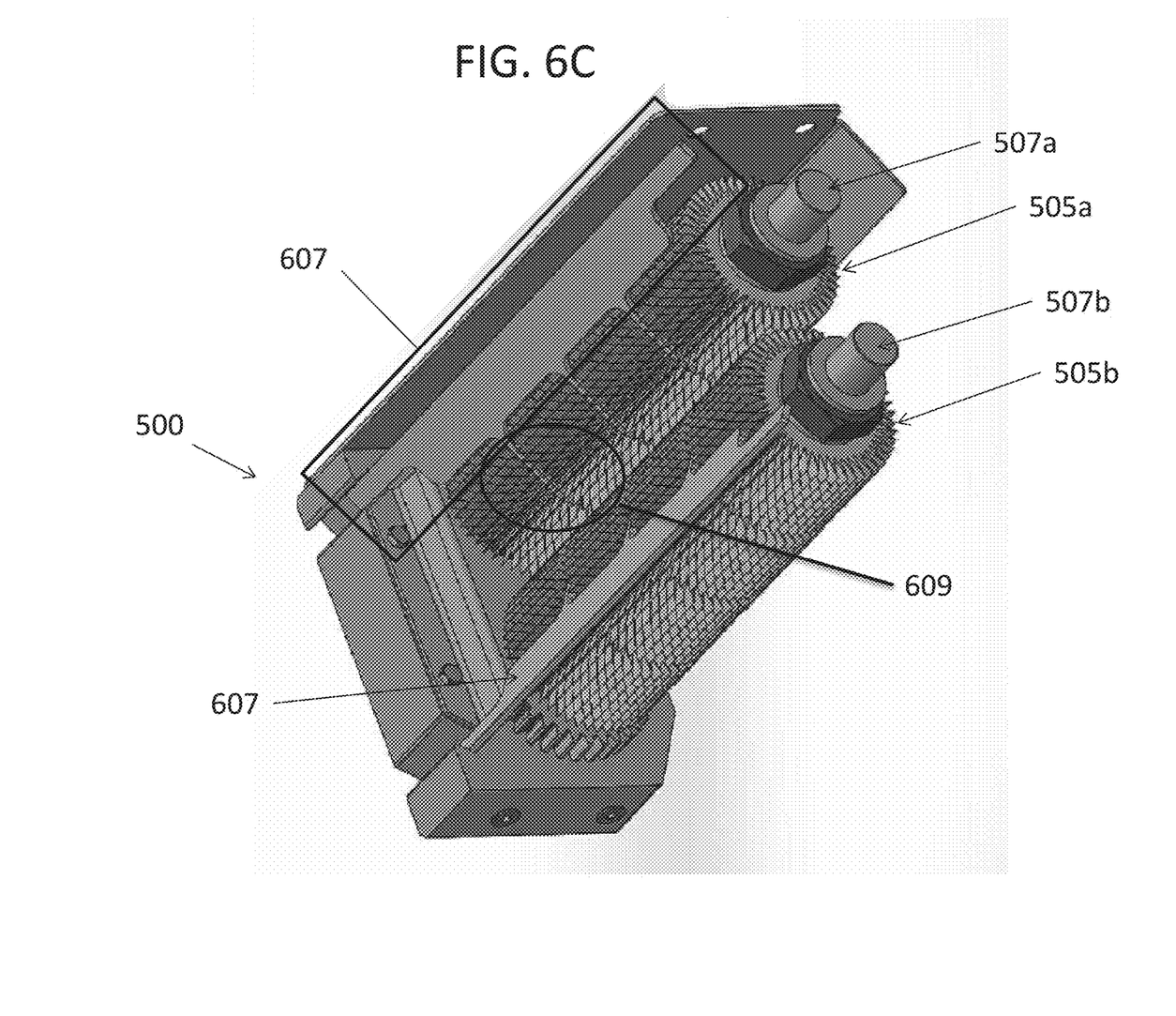
FIG. 6C illustrates an isometric view of a cross cut tenderizer cartridge with a side removed, according to an example embodiment of the present inventive concept.

FIGS. 6A through 6C respectively illustrate top, side, and isometric views of a cross cut cartridge 500 including fine cross cut blades 401 according to an example embodiment of the present inventive concept. According to example embodiments herein, some spacers 503 are required in a stack 505a, 505b of a cross-cut cartridge 500 in order to introduce a stripper 607 (see FIG. 6C) to peel the meat product off of the blades 401 as the product exits the cartridge 500 so that the product will not wrap around one of the stacks 505a, 505b. The stripper 607 can be positioned adjacent to each stack 505a and 505b. FIG. 6C also illustrates a plurality of "fingers" 609 originating at the stripper 607 and protruding into the stacks 505a, 505b of blades 401. Each "finger" 609 of a cross-cut cartridge 500 according to an example embodiment of the present inventive concept extends at the same location from the stripper(s) 607 as where the spacers 503 are disposed. The fingers 609 can be disposed above the spacers, perpendicular with and along the length of the shafts 507a, 507b. The stripper 607 is configured to peel meat product off the respective stack 505a, 505b as the meat product exits the cartridge 500, thus preventing the product from hanging onto the blades 401 and wrapping around the stacks 505a, 505b. The spacers 503, which may be disposed under the fingers 609 (i.e., closer to the rotating shaft that supports the stack), serve to space groups 610 of the blades 401 from one another and make room for the stripper fingers 609. Thus the spacers 503 and fingers 609 can be disposed between each of the groups 610 of blades 401.

Referring to FIG. 6A, an enlarged view of a section A of opposing groups 610 of blades 401 illustrates at B a plurality of the teeth 401a of one blade 401. The same enlarged view of section A of opposing groups 610 of blades 401 illustrates at C adjacent blades 401 within a group 610, where the adjacent blades 401 form ridges in parallel with the shafts. These continuous rows of ridges create the horizontal crosscut in the meat product.

FIG. 6B illustrates at D where the blades 401 do not overlap, and that each blade of the top stack 505a aligns with a corresponding blade 401 on the bottom stack 505b. With this arrangement the meat product being tenderized is prevented from sticking on the teeth of one of the stacks of blades, and also is prevented from tearing or being chewed up as a result of sticking to the teeth of both stacks of blades, as often occurs with the conventional tenderizer cartridges.

Figure 7:
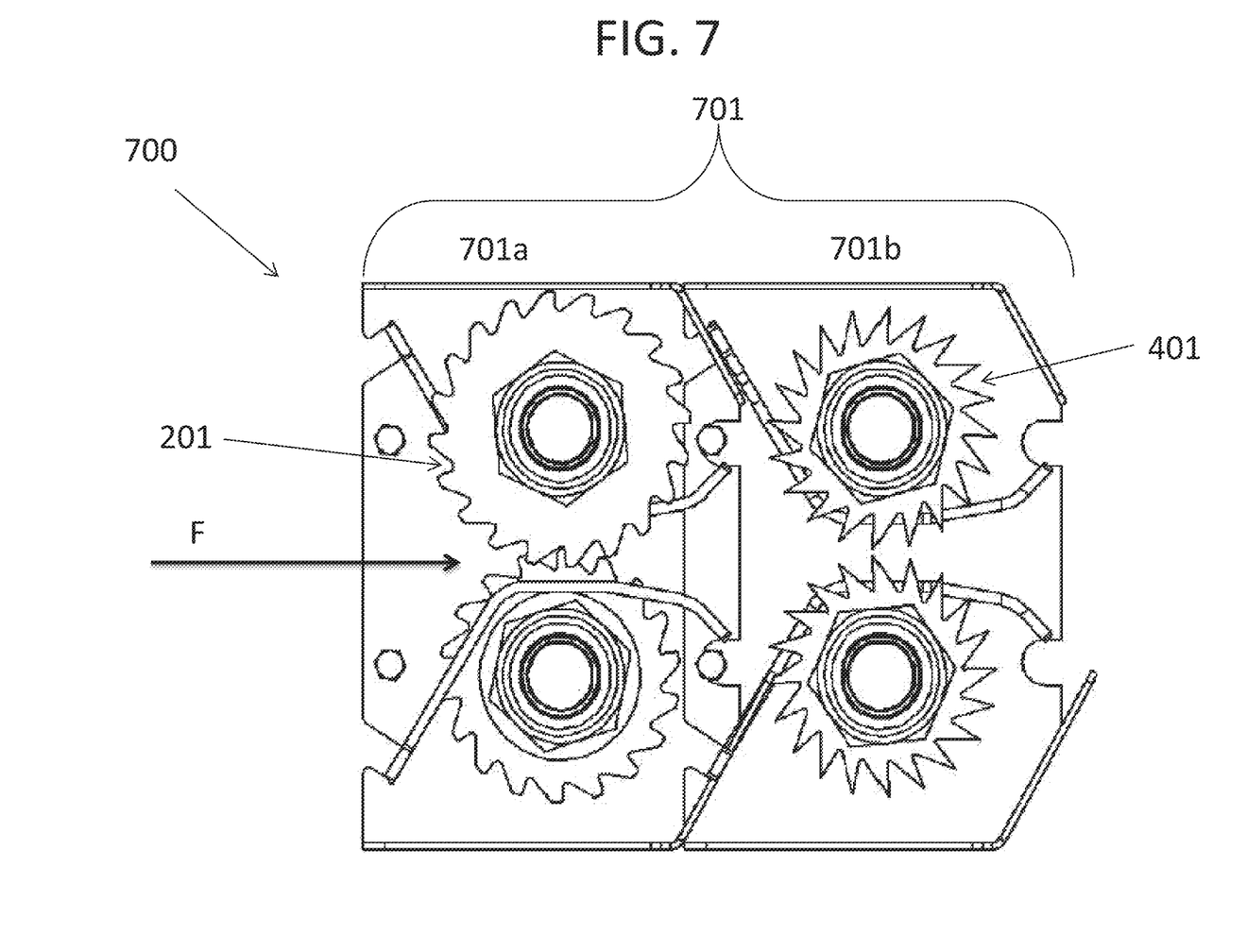
FIG. 7 illustrates a tenderizer system according to an example embodiment of the present general inventive concept.

FIG. 7 illustrates a tenderizer system 700 according to another example embodiment. As illustrated in FIG. 7, the tenderizer system 700 may include a cartridge 701 that includes two pairs of shafts and stacks. At one side (i.e., left side) of the cartridge 701 is a conventional blade arrangement 701a (similar to that illustrated in FIGS. 3A through 3B), and at the opposite side of the cartridge 701 is a cross-cut blade arrangement 701b (similar to that illustrated in FIGS. 5A through 5B and FIGS. 6A through 6C). According to this example embodiment, the conventional blade arrangement 701a is at the entrance to the cartridge 701, such that untreated meat product passes through the conventional blades 201 first, and is then subsequently moved to the cross-cut blade arrangement 701b according to example embodiments described herein.

In this example embodiment, both the traditional tenderizer blades 201 and the cross-cut blades 401 according to example embodiments herein are oriented such that meat product passes through them from one side to another side in a conveyor type feeding system 700. However, the present inventive concept is not limited to this example embodiment, for example, the blade arrangements 701a and 701b may be oriented such that meat product passes through the tenderizer system 700 from top to bottom, allowing gravity to help in pulling the meat product through the cartridge 701.

Additionally, the blades may be included in any order, according to different example embodiments. For example, the cross-cut tenderizer blades 401 in the blade arrangement 701b may be positioned at the entrance of the cartridge 701, and the conventional blade arrangement 701a may be positioned after the cross-cut blades 401, such that untreated meat product passes through the cross-cut blade arrangement 701b first, and then through the traditional blade arrangement 701a.

According to exemplary embodiments of the present general inventive concept, meat products will exit a tenderizer system with a cross cut pattern, while no human hands or cumbersome mechanisms are required to rotate the meat products by 90 degrees. Accordingly, the efficiency of the cross-cut process can be greatly increased.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A cross-cut tenderizer, comprising:
  a cartridge body including:
    at least two shafts in parallel; and
    a stack of blades disposed on each shaft, at least a majority of the blades being in contact with each other along a respective shaft, each blade including teeth around outer circumferences thereof, the teeth of each blade in contact being in alignment to form continuous ridges that extend in parallel with the shafts.

2. The tenderizer according to claim 1, further comprising spacers disposed between a predetermined number of blades in a stack to form separate groups of the blades along each shaft.

3. The tenderizer according to claim 2, further comprising:
a stripper extending from at least one portion of the cartridge body and in parallel with and adjacent to the length of a corresponding stack of blades, the stripper extending from a side of the cartridge body where tenderized products exit from the opposing stacks to separate the tenderized product from the stack.

4. The tenderizer according to claim 3, wherein the at least one stripper comprises:
fingers extending therefrom at predetermined locations to extend between each group of stacks and above a respective spacer.

5. The tenderizer according to claim 1, wherein the blades on opposing shafts are in alignment with each other.

6. The tenderizer according to claim 5, wherein the blades in alignment with each other on opposing shafts are also in contact with each other.

7. The tenderizer according to claim 5, wherein the blades in alignment with each other on opposing shafts are separated from each other by a predetermined distance.

8. The tenderizer according to claim 1, wherein the teeth on each blade are pointed at end portions thereof farthest from the shafts.

9. A cross-cut tenderizer system, comprising:
a cartridge body including a first cartridge portion and a second cartridge portion, wherein:
the first cartridge portion includes first and second shafts in parallel, the first and second shafts each including a stack of adjacent blades with teeth thereon, each adjacent blade being separated by a spacer and the stack of blades on the first shaft being shifted from the stack of blades on the second shaft; and
the second cartridge portion includes first and second shafts in parallel, the first and second shafts each including a stack of adjacent blades with teeth thereon, each stack of blades having teeth in alignment.

10. The system according to claim 9, wherein each stack of blades of the second cartridge portion including groups of blades being separated from each other by spacers, each group of blades being in contact with each other to form continuous ridges that extend in parallel with the shafts.

11. The system according to claim 10, wherein:
the blades on the first shaft of the first cartridge portion overlap with the blades on the second shaft of the first cartridge portion; and
the blades on the first shaft of the second cartridge portion are aligned with the blades on the second shaft of the second portion and the teeth.

12. The system according to claim 11, wherein the teeth on each pair of aligned blades in the second cartridge are aligned with each other.

13. The tenderizer according to claim 9, wherein the blades in alignment with each other on the first and second shafts are also in contact with each other.

14. The tenderizer according to claim 13, wherein the blades in alignment with each other on the first and second shafts are separated from each other by a predetermined distance.

15. The tenderizer according to claim 13, further comprising:
a stripper extending from at least one portion of the second cartridge portion and in parallel with and adjacent to a corresponding one of the stacks of blades, the stripper extending from a side of the second cartridge portion where tenderized products exit from the first and second stacks to separate the tenderized product from the stack.

16. The tenderizer according to claim 15, wherein a stripper extends from two portions of the second cartridge portion and in parallel with and adjacent to a corresponding stack of blades.

17. The tenderizer according to claim 16, wherein each stripper comprises:
fingers extending therefrom at predetermined locations to extend between each group of stacks and above a respective spacer.

18. The system according to claim 9, wherein:
the blades on the first shaft of the first cartridge portion overlap with the blades on the second shaft of the first cartridge portion; and
the blades on the first shaft of the second cartridge portion are aligned with the blades on the second shaft of the second portion and the teeth.

19. The system according to claim 18, wherein the teeth on each pair of aligned blades in the second cartridge are aligned with each other.

20. The tenderizer according to claim 19, wherein the blades in alignment with each other on the first and second shafts are also in contact with each other.

21. The tenderizer according to claim 19, wherein the blades in alignment with each other on the first and second shafts are separated from each other by a predetermined distance.

22. A meat product tenderizing method, comprising:
feeding a meat product through one passage of a tenderizer system such that the tenderizing system:
tenderizes the meat product along a length of the meat product as the product passes through a first set of blades; and
tenderizes the meat product across the width of the meat product as the product passes through a second set of blades.

23. The method according to claim 22, wherein the tenderizing of the meat along the length thereof is substantially perpendicular to the tenderizing of the meat across the width thereof.

* * * * *